(12) United States Patent
Spatafora

(10) Patent No.: US 7,341,141 B2
(45) Date of Patent: Mar. 11, 2008

(54) METHOD AND UNIT FOR GROUPING PRODUCTS

(75) Inventor: Mario Spatafora, Via Silone (IT)

(73) Assignee: G.D. Societa' per Azioni, Bologna (IT)

( * ) Notice: Subject to any disclaimer, the term of this patent is extended or adjusted under 35 U.S.C. 154(b) by 160 days.

(21) Appl. No.: 11/418,538

(22) Filed: May 4, 2006

(65) Prior Publication Data

US 2006/0280592 A1    Dec. 14, 2006

(30) Foreign Application Priority Data

May 10, 2005   (IT)  .......................... BO2005A0335

(51) Int. Cl.
*B65G 47/26* (2006.01)
(52) U.S. Cl. ............... 198/460.2; 198/460.1; 198/812; 198/597
(58) Field of Classification Search ................ 198/812, 198/588, 597, 598, 429, 460.1, 460.2
See application file for complete search history.

(56) References Cited

U.S. PATENT DOCUMENTS

| | | | | |
|---|---|---|---|---|
| 2,932,376 A | * | 4/1960 | Millington | ................... 198/594 |
| 4,413,724 A | * | 11/1983 | Fellner | ........................ 198/598 |
| 4,549,617 A | * | 10/1985 | Matsumoto et al. | ........... 177/1 |
| 4,961,488 A | * | 10/1990 | Steeghs | .................... 198/460.2 |
| 5,322,154 A | * | 6/1994 | Lenherr | .................... 198/460.2 |
| 5,547,004 A | * | 8/1996 | Fransen | .................... 198/460.2 |
| 5,772,005 A | * | 6/1998 | Hansch | ........................ 198/594 |
| 5,900,265 A | * | 5/1999 | Rutherford | ................... 426/281 |
| 6,260,688 B1 | | 7/2001 | Steeber et al. | |
| 6,591,963 B2 | * | 7/2003 | Wipf | ........................... 198/812 |
| 6,698,581 B2 | * | 3/2004 | Steeber et al. | .............. 198/594 |
| 6,913,135 B2 | * | 7/2005 | Borderi et al. | ........... 198/460.2 |
| 7,222,723 B2 | * | 5/2007 | Horton et al. | .............. 198/594 |

FOREIGN PATENT DOCUMENTS

| | | |
|---|---|---|
| DE | 1124584 | 3/1962 |
| DE | 26 18 905 | 11/1977 |
| EP | 0919 494 | 6/1999 |
| EP | 1-295820 | 3/2003 |

* cited by examiner

*Primary Examiner*—James R. Bidwell
(74) *Attorney, Agent, or Firm*—Gottlieb, Rackman & Reisman

(57) ABSTRACT

Groups containing a given number of products are produced using a transfer assembly, wherein a first, pocket-type output, conveyor of a production machine, and a second, pocket-type input, conveyor of a group-forming machine move continuously in a first and, respectively, second direction opposite each other, and are connected to each other by a pocket-type transfer member, which is interposed between the first and second conveyor, and is operated to selectively rotate about an axis of rotation crosswise to the first and second conveyor; or to translate, together with the second conveyor, crosswise to the axis of rotation to compensate for one or more voids on the first conveyor; or to translate, together with the first conveyor, crosswise to the axis of rotation to form, on the second conveyor, a succession of voids in time with the group-forming machine.

14 Claims, 1 Drawing Sheet

METHOD AND UNIT FOR GROUPING PRODUCTS

The present invention relates to a method and a unit for grouping products into groups containing a given number K of products.

BACKGROUND OF THE INVENTION

More specifically, the present invention employs a unit for forming groups of products, the unit being of the type comprising a production machine for producing the products; a group-forming machine for forming the products into groups of K products; and a transfer assembly for transferring the products from the production machine to the group-forming machine; the transfer assembly comprising a first output conveyor of the production machine, and a second input conveyor of the group-forming machine; the first and second conveyor moving respectively in a first and second direction opposite each other, and respectively comprising first and second pockets with a first and second spacing respectively.

Though suitable for any type of product, the present invention may be used to advantage in the tobacco industry, on a cellophaning-cartoning unit, to which the following description refers purely by way of example, and for packing, on a group-forming machine defined by a cartoning machine comprising an input pocket conveyor, groups of K packets of cigarettes produced on a production machine—in this case, a cellophaning machine—comprising an output pocket conveyor.

The output and input pocket conveyors of known units of the type described above used to form a single transfer pocket conveyor for transferring packets directly from the cellophaning machine to the cartoning machine in a single orderly succession.

Such a solution had the obvious advantage of maintaining precise timing of the two machines, but also the obvious disadvantage of failing to compensate for any voids, i.e. empty pockets, along the transfer conveyor, and so preventing the formation of incomplete groups on the cartoning machine.

To eliminate the above drawback, it has since been proposed to keep the output and input conveyors separate, and to connect them with the interposition of a FIFO (first-in-first-out) inter operational store, which receives a first orderly succession of packets in time with the cellophaning machine, and in which the packets are formed into queues, from which the packets are withdrawn by the input pocket conveyor of the cartoning machine and again formed into a second succession in time with the cartoning machine.

This provides for compensating for any voids along the output conveyor of the cellophaning machine, but results in a loss of synchronization of the two machines. Moreover, at relatively high production speeds, withdrawing the packets from the queues formed in the inter operational store is neither straightforward nor easy, and may easily result in damage to the packets.

DE2618905 discloses a bar item transverse conveyor having an intermediate conveyor with movable reversal point between feed and discharge conveyors.

DE1124584 discloses a device for transferring items between two belt conveyors having different feeding speeds.

SUMMARY OF THE INVENTION

It is an object of the present invention to provide a method and a unit for grouping products, which provide for maintaining synchronization of the production machine and the group-forming machine, while at the same time compensating for any voids coming off the production machine.

According to the present invention, there are provided a method and a unit for grouping products as claimed in the accompanying Claims.

BRIEF DESCRIPTION OF THE DRAWING

The present invention will be described with reference to the accompanying drawing, which shows a schematic side view, with parts removed for clarity, of a preferred embodiment.

DETAILED DESCRIPTION OF THE INVENTION

Figure 1:
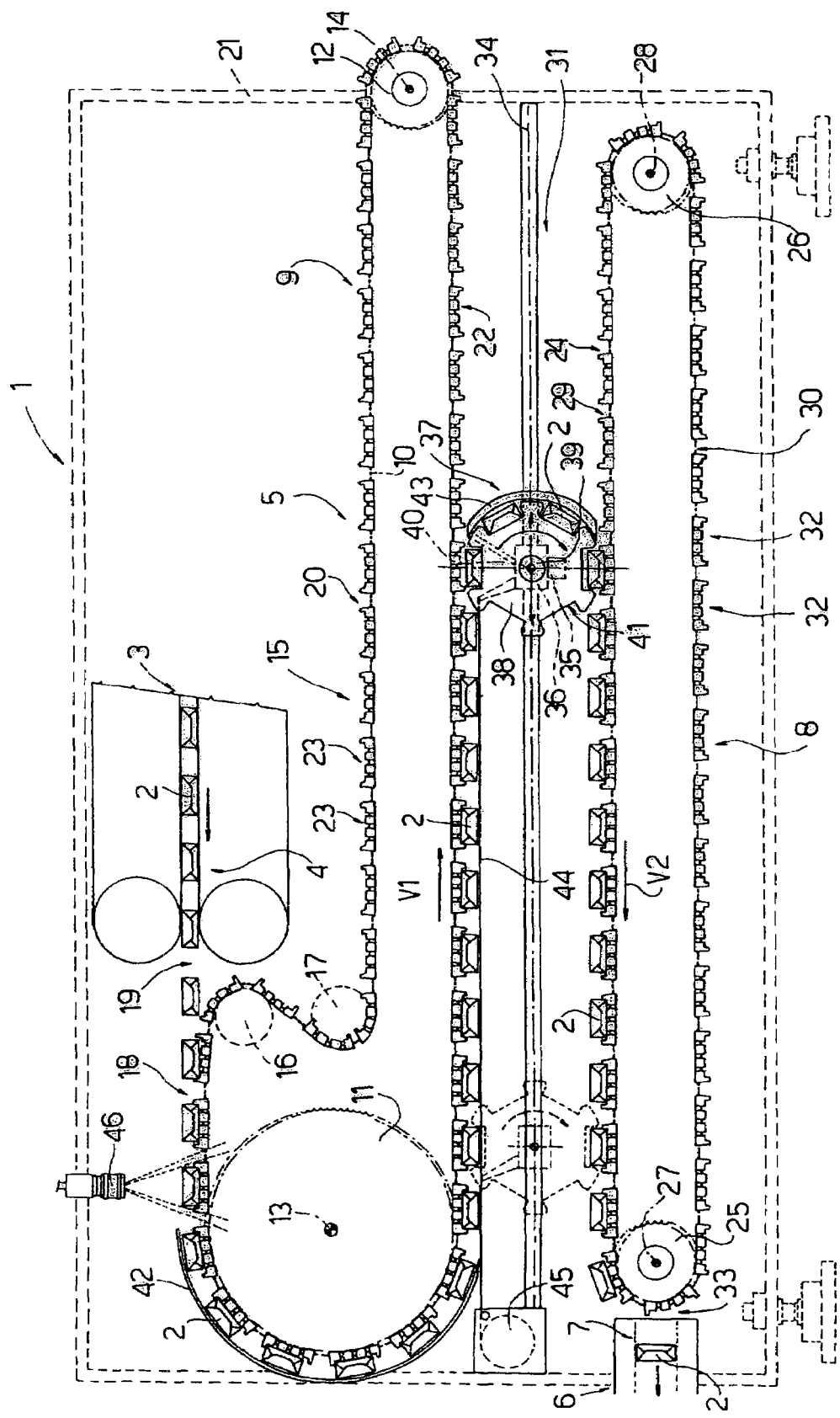

Number 1 in the accompanying drawing indicates as a whole a cellophaning-cartoning unit for packets 2 of cigarettes, which comprises a known cellophaning machine 3, from an output 4 of which packets 2 are fed in an orderly succession to an output pocket conveyor 5; and a known cartoning machine 6, an input 7 of which receives an orderly succession of packets 2 from an input pocket conveyor 8.

Output conveyor 5 and input conveyor 8 form part of a transfer assembly 9 for transferring packets 2 from cellophaning machine 3 to cartoning machine 6.

Output conveyor 5 comprises a chain 10 looped about two pulleys 11 and 12, of which pulley 11 is a drive pulley, and which are mounted to rotate continuously about respective fixed parallel axes 13 and 14, and define, along chain 10, a top branch 15 divided by two idle guide pulleys 16 and 17 into a horizontal input portion 18, aligned with output 4 and connected to output 4 at a transfer station 19, and into a horizontal return portion 20. Pulleys 11, 12, 16 and 17 are supported in fixed positions by a frame 21, and pulleys 11 and 12 define, along chain 10, a horizontal bottom conveying branch 22 parallel to input portion 18 and return portion 20 of top branch 15.

Chain 10 is fitted with cup-shaped pockets 23 equally spaced along chain 10 to successively receive packets 2 issuing from output 4. More specifically, chain 10 is fed forward by pulley 11 at a speed V1 equal to the speed of packets 2 at output 4, and in time with cellophaning machine 3, so that each packet 2 travelling through output 4 is inserted, by a known transfer member (not shown) at transfer station 19, into a relative pocket 23 starting along input portion 18 of top branch 15 of chain 10.

Input conveyor 8 comprises a chain 24 looped about two pulleys 25 and 26, of which pulley 25 is a drive pulley located directly beneath pulley 11. Pulleys 25 and 26 are supported in fixed positions by frame 21, are fitted to frame 21 to rotate continuously about respective fixed axes 27 and 28 parallel to each other and to axes 13 and 14, and define, along chain 24, a top conveying branch 29 and a bottom return branch 30, both horizontal and parallel to bottom branch 22 of output conveyor 5. More specifically, top branch 29 is parallel to, faces, and is located directly beneath bottom branch 22 to define, with bottom branch 22, a horizontal channel 31 of constant height.

Chain 24, in use, is fed forward by pulley 25 at a speed V2 which, along top branch 29, is equal to and opposite speed V1 of bottom branch 22. Chain 24 is fitted with cup-shaped pockets 32 substantially similar to pockets 23 and spaced along chain 24 with the same spacing as pockets 23 along chain 10. Chain 24 is fed forward by pulley 25 in time with both chain 10 and cartoning machine 6, the input of which faces and is adjacent to pulley 25 at a transfer station 33 where, in use, a known radial expulsion member (not shown) expels packets 2 successively from relative pockets 32 into input 7 of cartoning machine 6.

A horizontal guide 34 is fitted along channel 31, and a carriage 36 of a pocket transfer member 37 is run along the guide at speed V1 or V2 by a motor 35. In addition to carriage 36, the pocket transfer member also comprises a wheel 38 fitted to carriage 36 to rotate continuously, under the control of a motor 39 and at a peripheral speed equal in absolute value to V1 and V2, about an axis 40 movable with carriage 36 and parallel to axes 27 and 28. Wheel 38 has a number, in particular an even number, of peripheral cup-shaped pockets 41 substantially similar to pockets 23 and 32 and spaced about axis 40 with the same spacing as pockets 23 and 32 along respective chains 10 and 24.

In connection with the above, it should be pointed out that each of pockets 23, 32, 41 is a straightforward cavity for receiving, but not retaining, a relative packet 2. Consequently, pulley 11 is provided, along its periphery contacting chain 10, with a fixed outer plate 42 for retaining packets 2 inside pockets 23; and wheel 38 is provided, along its periphery interposed between bottom branch 22 and top branch 29, with an outer plate 43 integral with carriage 36 and for retaining packets 2 inside pockets 41. The packets 2 travelling along bottom branch 22 are retained inside relative pockets 23 by a flexible retaining member 44, which is parallel to guide 34, extends, tangent to the output end of plate 42, from a spring winding device 45 fitted in a fixed position to frame 21 between pulleys 11 and 25, and has one end connected by a bracket to carriage 36.

In actual use, before starting up cellophaning-cartoning unit 1, transfer member 37 is normally set to an intermediate position along channel 31. When the unit is running, if a sensor 46, positioned facing input portion 18 of top branch 15 of output conveyor 5, detects packets 2 coming off cellophaning machine 3 are inserted successively into all of pockets 23, motor 35 of carriage 36 is left idle, and only motor 39 is operated to keep carriage 36 stationary in its set position along guide 34 and only rotate wheel 38 about axis 40. Wheel 38 is kept in time with output conveyor 5 and input conveyor 8, so that each packet 2 travelling along output conveyor 5 inside a relative pocket 23 engages a relative pocket 41 on wheel 38 at the point of tangency between wheel 38 and bottom branch 22 of output conveyor 5. Since, as shown in the attached drawing, each pocket 23 is detached from flexible retaining member 44 at the point of tangency with wheel 38, and since pockets 23 have no retaining members or devices for retaining relative packets 2, each packet 2 is transferred by gravity from relative pocket 23 to relative pocket 41 at said point of tangency, and is again transferred by gravity from relative pocket 41 to relative pocket 32 at the point of tangency between top branch 29 and wheel 38.

Conversely, if a void, i.e. an empty pocket 23, is detected along output conveyor 5, sensor 46 memorizes the location of the void and, as the void approaches the point of tangency with wheel 38, stops motor 39 and starts motor 35 to connect carriage 36 to top branch 29 of input conveyor 8 and move said point of tangency up to the next occupied pocket 23. At this point, motor 35 is stopped, and motor 39 is started again to continue transfer at the new point of tangency, thus compensating for the void and ensuring all the pockets 32 downstream from wheel 38 along top branch 29 of input conveyor 8 are filled.

Obviously, if there are a number of consecutive voids along bottom branch 22 of output conveyor 5, carriage 36 is moved, with wheel 38 stationary and at speed V2, leftward in the drawing and is stopped in front of the first next occupied pocket 23.

If carriage 36 is moved too far to the left for further successive voids to be compensated, or if so decided by the operator or a control program, the non-compensated voids are transferred successively to top branch 29. Just before or just after the voids are transferred to top branch 29, carriage 36 is moved right wards, with wheel 38 stationary and at speed V1, to create, along top branch 29, further voids adjacent to those not compensated, and to form, on top branch 29, a total number of K consecutive voids, where K is the number of packets 2 forming a carton (not shown) formed on cartoning machine 6.

In other words, leftward movement of carriage 36 at speed V2 is equal in length to the same number of spaces between pockets 23 as the number of detected empty pockets 23; whereas rightward movement at speed V1 is equal in length to such a number of spaces between pockets 32 as to form, on top branch 29, a group of K consecutive empty pockets 32 in time with cartoning machine 6.

The sequence of K consecutive voids fed to cartoning machine 6 must obviously be in time with cartoning machine 6 to allow carriage 36 to move right wards along guide 34 back into at least a central position along guide 34, and also to allow cartoning machine 6 to perform a complete no-load cycle without generating any rejects.

The invention claimed is:

1. A method of grouping products into groups containing a given K number of products (2); the method comprising the steps of:

feeding an orderly succession of products (2) in a first direction by means of a first conveyor (22) having a succession of first pockets (23) spaced with a first spacing and each housing a relative product (2);

imparting a first movement to a transfer member (37) to transfer each product (2) from the relative first pocket (23) to a relative second pocket (32) of a second conveyor (29), along which the second pockets (32) are spaced with a second spacing; and successively feeding the second pockets (32) and the relative products (2) in a second direction, opposite the first direction, to group-forming means (6) for forming said groups;

the method being characterized by comprising, in response to detection of at least one empty first pocket (23) along the first conveyor (22) and upstream from the transfer member (37), the further steps of arresting the first movement and imparting to the transfer member (37) a second movement achieved by making the transfer member (37) integral with one of said first and said second conveyor (22, 29), and by moving the transfer member (37) along the other of said first and said second conveyor (22, 29);

the second movement, when performed in said second direction, is equal in length to one said first spacing, in response to detection of each empty said first pocket (23), to compensate for the presence of the empty first pocket (23), and, when performed in said first direction, being equal in length to such a number of second spacings as to form, on the second conveyor (29), a group of K consecutive empty second pockets (32) in time with said group-forming means (6).

2. A method as claimed in claim 1, wherein the first movement is a rotation of the transfer member (37) about an axis (40), and the second movement is a translation of the transfer member (37), crosswise to said axis (40), in one of said first and said second direction.

3. A method as claimed in claim 1, wherein said first and said second spacing are equal; the transfer member (37) comprising third pockets (41) spaced about an axis (40) with a third spacing equal to the first and second spacing; and the third pockets (41), when the first movement is imparted, being moved about said axis (40) and in time with the first and second pockets (32) to transfer respective products (2) from respective first pockets (23) to respective second pockets (32).

4. A method as claimed in claim 1, wherein said first and said second spacing are equal; the transfer member (37) having third pockets (41) spaced about an axis (40) with a third spacing equal to the first and second spacing; and the third pockets (41), when the second movement is imparted, being maintained stationary with respect to said axis (40), and being translated, with said axis (40) and crosswise to said axis (40), in one of said first and said second direction.

5. A unit for grouping products; the unit (1) comprising:
a production machine (3) for producing the products (2);
a group-forming machine (6) for forming the products (2) into groups of K products (2); and
a transfer assembly (9) for transferring the products (2) from the production machine (3) to the group-forming machine (6); the transfer assembly (9) comprising a first, output, conveyor (22) of the production machine (3), and a second, input, conveyor (29) of the group-forming machine (6); the first and second conveyor (22, 29) moving respectively in a first and a second direction opposite each other, and respectively comprising first and second pockets (23, 32) spaced with a first and a second spacing respectively;
the unit (1) being characterized by comprising detecting means (46) for detecting empty first pockets (23) along the first conveyor (22); the transfer assembly (9) also comprising a transfer member (37) interposed between the first and second conveyor (22, 29); first actuating means (39) for imparting to the transfer member (37) a first movement with respect to the first and second conveyor (22, 29) to transfer the products (2) successively from the first (22) to the second (29) conveyor; and second actuating means (35), alternative to the first actuating means (39), to impart to the transfer member (37) a second movement, together with one of said first and said second conveyor (22, 29) and along the other of said first and said second conveyor (22, 29); the second movement, when performed in the second direction, being equal in length to one said first spacing, in response to detection of each empty said first pocket (23), to compensate for the presence of the empty first pocket (23), and, when performed in said first direction, being equal in length to such a number of second spacings as to form, on the second conveyor (29), a group of K consecutive empty second pockets (32) in time with the group-forming machine (6).

6. A unit as claimed in claim 5, wherein the first and second conveyor (22, 29) are positioned facing and parallel, and move continuously in the first and second direction respectively.

7. A unit as claimed in claim 5, wherein the transfer member (37) has third pockets (41) having a third spacing equal to the first and second spacing.

8. A unit as claimed in claim 7, wherein the transfer member (37) is mounted so as to be rotated about an axis (40) by the first actuating means (39), and to be translated crosswise to said axis (40) by the second actuating means (35); said axis (40) being crosswise to the first and second direction; and the third pockets (41) being equally spaced about said axis (40).

9. A unit as claimed in claim 5, wherein the transfer member (37) comprises a wheel (38) interposed between the first (22) and second (29) conveyor, tangent to the first and second conveyor (22, 29), rotated about an axis (40) by the first actuating means (39), and translated crosswise to said axis (40) and parallel to the first and second conveyor (22, 29) by the second actuating means (35).

10. A unit as claimed in claim 5, wherein the second actuating means (35) are reversible to translate the transfer member (37) together with the first (22) or second conveyor (29).

11. A unit as claimed in claim 7, wherein each of the first, second, and third pockets (23, 32, 41) is cup-shaped and retains a relative product (2) by gravity.

12. A unit as claimed in claim 11, wherein at least one portion of said first or said second conveyor (22, 29) faces downwards; retaining means (44, 45) extending along and beneath the downward-facing said portion to retain the relative products (2) inside the relative pockets (23; 32).

13. A unit as claimed in claim 12, wherein the first and second conveyor (22, 29) have a first and a second length, respectively, which are variable by said second movement; said retaining means (44, 45) having a length which varies with said first and said second length.

14. A unit as claimed in claim 12, wherein the retaining means (44, 45) comprise a flexible retaining member (44) connected to the transfer member (37); and a fixed spring winding device (45) for the flexible retaining member (44).

* * * * *

UNITED STATES PATENT AND TRADEMARK OFFICE
CERTIFICATE OF CORRECTION

PATENT NO.        : 7,341,141 B2
APPLICATION NO.   : 11/418538
DATED             : March 11, 2008
INVENTOR(S)       : Mario Spatafora It is certified that error appears in the above-identified patent and that said Letters Patent is hereby corrected as shown below:

Title Page,

Item (75) Inventor:

Change "Mario Spatafora, Via Silone" to -- Mario Spatafora, Granarolo --

Item (73) Assignee:

Change "G. D. Societa per Azioni" to -- G. D Societa per Azioni --

Signed and Sealed this

Tenth Day of March, 2009

JOHN DOLL
*Acting Director of the United States Patent and Trademark Office*